May 7, 1963  F. D. STOTT  3,088,716
MAGNETIC STIRRERS
Filed May 1, 1961

INVENTOR
FRANK DUDLEY STOTT
BY

United States Patent Office 3,088,716
Patented May 7, 1963

3,088,716
MAGNETIC STIRRERS
Frank Dudley Stott, Wootton, Woodstock, England, assignor to National Research Development Corporation, London, England, a British corporation
Filed May 1, 1961, Ser. No. 106,776
Claims priority, application Great Britain May 6, 1960
11 Claims. (Cl. 259—144)

This invention relates to a magnetic stirrer, and has for an object to provide a simple and effective device for stirring liquid which avoids the necessity for the immersion of any journal or like bearing in the liquid. It also aims at providing a device which produces stirring action having both horizontal and vertical components of displacement.

According to the present invention, a magnetic stirrer consists of a rotary magnetic field generator which is adapted to be mounted beneath a liquid container or vessel of non-magnetic material so as to generate a field which rotates about a vertical axis through the liquid, and a magnetic stirring element of conical or dynamically equivalent shape adapted to lie on its side on the bottom of the vessel and to roll thereon in a circular path about the said vertical axis so that, in any stable position, the base of the cone is tilted at a constant angle to the plane of the bottom of the vessel.

By "dynamically equivalent shape" is meant any shape which can roll in the same manner as a cone resting on its side and with the same stability.

The rotary field generator may be a salient pole magnet mounted asymmetrically with respect to the vertical axis of rotation so that its poles lie on a radius to the axis, the radius of the path swept by the outer pole being of the same order as the rolling radius of the base of the cone.

Alternatively, the rotary field generator may be a fixed multipolar field winding adapted to be energised by a polyphase A.C. supply so as to produce a rotating field about the vertical axis through the liquid in the container or vessel.

Figure 1:
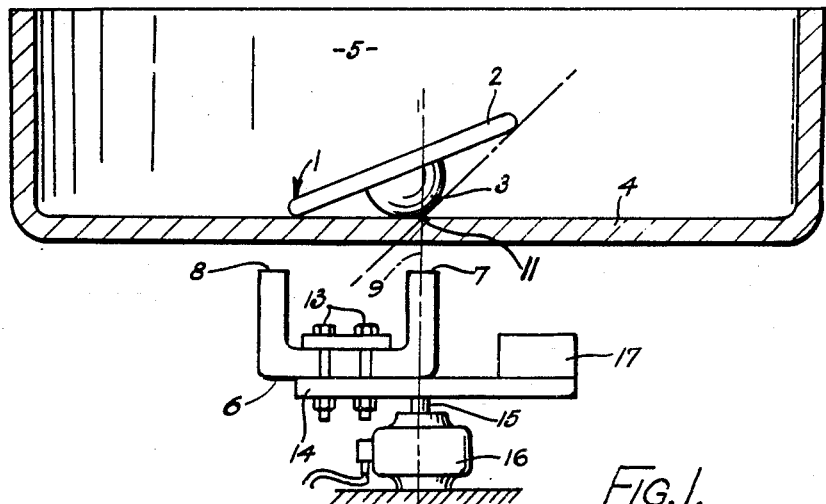
Figure 2:
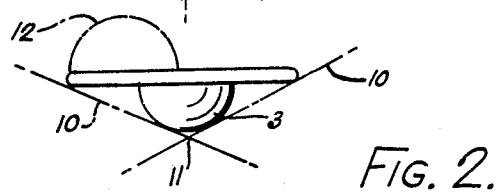
Figure 3:
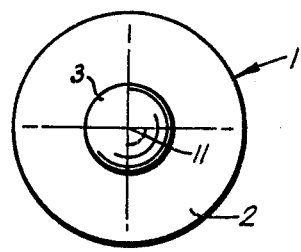

A preferred embodiment of the invention is illustrated in the accompanying drawings in which:

FIGURE 1 is a transverse sectional elevation of a vessel having a stirrer according to the present invention; and FIGURES 2 and 3 are side and underplan views respectively of the stirring element.

The stirring element 1 shown in the drawings consists of a disc 2 on the under-face of which is secured a hemisphere 3, the centres of the disc and hemisphere being coincident. The ratio of the radii of the hemisphere and the disc is of the order of 1:4 or 1:3. Both components are of a ferro-magnetic material, and are preferably encased in a thin sheath of a synthetic resin plastic such as polythene or other chemically inert substance.

The stirring element 1 is placed on the flat bottom 4 of a liquid container or vessel 5 of non-magnetic material, and rests on the rim of the disc 2 and on the hemisphere 3. Beneath the container or vessel bottom 4 is mounted a U-shaped salient-pole magnet 6, which may be permanent or D.C.-energised, with the limbs of the U upturned so that the poles 7, 8 lie in a plane parallel and close to the underside of the bottom 4.

The magnet 6 is clamped by bolts 13 to a circular plate 14 keyed on the vertical shaft 15 of an electric motor 16 so that the axis of one pole 7 of the magnet is coincident with the axis of the shaft 15. The magnetic field system 6, 7, 8 is dynamically balanced for rotation about the axis 9 by means of a counterweight 17 on the plate 14.

The shape of the stirring element 1 shown in the drawings is dynamically equivalent to an imaginary wide-angle cone whose base is the disc 2 and whose conical surface 10 is tangential to the hemisphere 3 and includes the rim of the disc 2. The element 1 rolls about a centre 11 which coincides with the peak of the imaginary cone 10, and this point 11 ideally lies on the axis 9. Furthermore, it has the same stability as the imaginary cone 10 in that its centre of gravity is always vertically above the generatrix of the conical surface 10 on which the element happens to rest at any given instant.

The angle of inclination of the disc 2 to the bottom 4 ensures that, when the stirring element 1 is immersed in liquid in the vessel 5 and rolls on the bottom, the face of the disc 2 sets up motion in the liquid having both horizontal and vertical components. This promotes efficient stirring action throughout the body of liquid. Furthermore, the motion of the element 1 on the vessel bottom 4 is purely a rolling motion, thus reducing the frictional drag on the stirrer.

In a practical example, a disc 2 having a diameter of 3″ and driven at a speed of 16 r.p.m. gives adequate agitation for dialysing purposes in a 2-gallon bucket. For a vessel of the order of 5 to 10 gallons capacity the speed would be increased to approximately 30 to 60 r.p.m., the speed range depending to some extent on the relationship of depth to diameter and on the viscosity. The optimum relationship between depth and diameter of the body of liquid to be stirred is about 1½:1.

Various alternative shapes of element 1 are possible, from the pure cone indicated at 10 to a disc having a central pin projecting from one face thereof.

One or more radial or diametral vanes, indicated in chain lines at 12 in FIGURE 2, can be fixed normal to the operative surface of the disc 2 to increase agitation in liquids of low viscosity such as water. As shown, the vane 12 when seen in side elevation is a semi-circle on a radius of the disc 2, but other shapes may be used if preferred. Such a vane, however, is not appropriate with liquids of high viscosity.

I claim:

1. A stirrer for stirring liquids in generally flat-bottomed containers comprising a stirring element of magnetic material shaped so as to be dynamically equivalent to a wide-angled cone resting on the container bottom along a generatrix of the conical surface and free to roll on said bottom with the conical wall of said cone always in contact with the bottom, and a rotary magnetic field system acting on said stirring element, the axis of rotation of said field system being substantially normal to the plane tangential to said conical surface and containing said generatrix.

2. A stirrer for stirring liquids in generally flat-bottomed containers comprising a stirring element of magnetic material having a flat disc portion and a projection on the underside thereof symmetrical about the axis of rotation of said disc, said stirring element being dynamically equivalent to a cone free to roll on its conical surface on the container bottom with a generatrix of said surface always in contact with said bottom, said flat disc portion constituting the base of the rolling cone, and a rotary magnetic field system acting on said stirring element with its axis of rotation substanitally vertical.

3. A stirrer for stirring liquids in generally flat-bottomed containers comprising a stirring element of magnetic material having a flat disc portion and a generally hemispherical projection on the underside thereof concentric with said disc, said stirring element being dynamically equivalent to a cone free to roll on its conical surface on the container bottom with a generatrix of said surface always in contact with said bottom, said flat disc portion constituting the base of the rolling cone, and a rotary magnetic field system acting on said stirring element with its axis of rotation substantially vertical.

4. A stirrer for stirring a liquid in a generally flat-bottomed container comprising a magnetic stirring element shaped so as to exhibit the same dynamic stability as a cone rolling on its conical surface and having a disc-like portion, representing the base of the cone, and exposed to the body of liquid in the container, and lying in a plane which makes a constant angle with the base of said container while the stirring element rolls on said conical surface, and a rotary magnetic field system beneath said container so as to act on said stirring element and having its axis of rotation substantially vertical.

5. A stirrer according to claim 4 wherein the stirring element has an upstanding vane which is on the exposed upper surface of the flat disc-like base and is eccentric to the geometric center of the disc-like base.

6. A stirrer for stirring a liquid in a container comprising a stirring element of magnetic material and having a disc-like portion with a central projection on its underside for supporting said element on the bottom of the container with said disc-like portion lying in a plane inclined during stirring at a constant acute angle to that of said container bottom; a permanent magnet beneath said container bottom; and a rotary carrier for supporting said magnet horizontally and rotating it about a vertical axis passing through one pole of said magnet.

7. A stirrer for stirring liquids in generally flat-bottomed containers comprising a stirring element of magnetic material shaped so as to roll in the manner of a cone lying on its side and having a flat disc-like base lying in a plane inclined at a constant acute angle to the plane of the bottom of said container, and a rotary magnetic field system interacting with said stirring element and comprising a horizontal bar magnet beneath said element and means for rotating said magnet in a horizontal plane about a vertical axis adjacent one end.

8. A stirrer for stirring liquids in generally flat-bottomed containers comprising a stirring element of magnetic material shaped so as to roll in the manner of a cone lying on its side and having a flat disc-like base lying in a plane inclined at a constant acute angle to the plane of the bottom of said container, and a rotary magnetic field system adapted to coact with said stirring element and comprising a U-shaped magnet mounted for rotation about a vertical axis coincident with the axis of one limb of the U, and means for rotating said magnet.

9. A magnetic stirrer for a liquid in a non-magnetic container comprising a rotary magnetic field system located beneath the bottom of the container so as to generate a magnetic field which rotates about a vertical axis through the liquid in said container, and a magnetic stirring element adapted to rest on the bottom of the container and of a shape dynamically equivalent to a wide-angle cone rolling on its side under the action of said rotary magnetic field, the base of said cone being constituted by a flat circular surface whose plane is inclined at a constant small angle to the plane of said bottom.

10. A magnetic stirrer according to claim 9 wherein the magnetic field system comprises a salient pole magnet mounted asymmetrically with respect to the axis of rotation and having its poles lying on a common horizontal radius through said axis, and means for rotating said magnet about said axis.

11. A magnetic stirrer according to claim 10 wherein said salient pole magnet is U-shaped with its poles upturned towards the container bottom, one of said poles being coaxial with said axis of rotation.

References Cited in the file of this patent
UNITED STATES PATENTS

| | | |
|---|---|---|
| 2,466,468 | Neal | Apr. 5, 1949 |
| 2,923,493 | Jacobs | Apr. 12, 1960 |
| 2,951,689 | Asp et al. | Sept. 6, 1960 |